United States Patent [19]
Matlock et al.

[11] 3,924,316
[45] Dec. 9, 1975

[54] TUBE PUSHING APPARATUS

[75] Inventors: Thomas D. Matlock, Morton, Pa.; Kenneth R. Smith, Alexandria, La.

[73] Assignee: Westinghouse Electric Corporation, Pittsburgh, Pa.

[22] Filed: Feb. 20, 1975

[21] Appl. No.: 551,808

[52] U.S. Cl.................... 29/202 R; 29/234; 29/282
[51] Int. Cl.² ......................................... B23P 15/26
[58] Field of Search.......... 29/202 R, 252, 244, 282, 29/234, 237, 280, 255

[56] References Cited
UNITED STATES PATENTS

| | | | |
|---|---|---|---|
| 2,823,153 | 2/1958 | Bonnell et al. | 29/234 |
| 3,123,906 | 3/1964 | Frink | 29/234 |
| 3,774,286 | 11/1973 | Reed | 29/234 |

Primary Examiner—James L. Jones, Jr.
Attorney, Agent, or Firm—F. J. Baehr, Jr.

[57] ABSTRACT

Apparatus for pushing tubes into a heat exchanger comprising a base portion having two guide pins which register with two holes in a tube sheet, and two concave idler rollers which cooperate with two pneumatically driven rollers to push the tubes into the heat exchanger.

11 Claims, 2 Drawing Figures

TUBE PUSHING APPARATUS

BACKGROUND OF THE INVENTION

This invention relates to apparatus for pushing tubes in a heat exchanger and more particularly to apparatus for pushing straight tubes into a condenser.

Manually tubing a condenser requires three men. One man inserts the tube in the hole and two men walk the tube toward the tube sheet as all three push it through the hole. As the day progresses the men slow down due to the fatigue resulting from continuously walking back and forth as the tubes are pushed and walked into the heat exchanger.

SUMMARY OF THE INVENTION

In general apparatus for pushing tubes having a bullet-shaped nose portion inserted therein through holes in a tube sheet of the heat exchanger when made in accordance with this invention, comprises a base portion, a plurality of guide pins which register with holes in the tube sheet to position the base portion relative to a specific hole through which the tube is to be pushed, at least one idler roller disposed on the base plate and at least one drive roller disposed on the base plate. The rollers are cooperatively associated to align the tube with the specific hole and cooperate with means for driving the drive roller to push the tube through the hole and into the heat exchanger.

BRIEF DESCRIPTION OF THE DRAWINGS

The objects and advantages of this invention will become more apparent from reading the following detail description in connection with the accompanying drawings, in which.

DESCRIPTION OF THE PREFERRED EMBODIMENT

Figure 1:
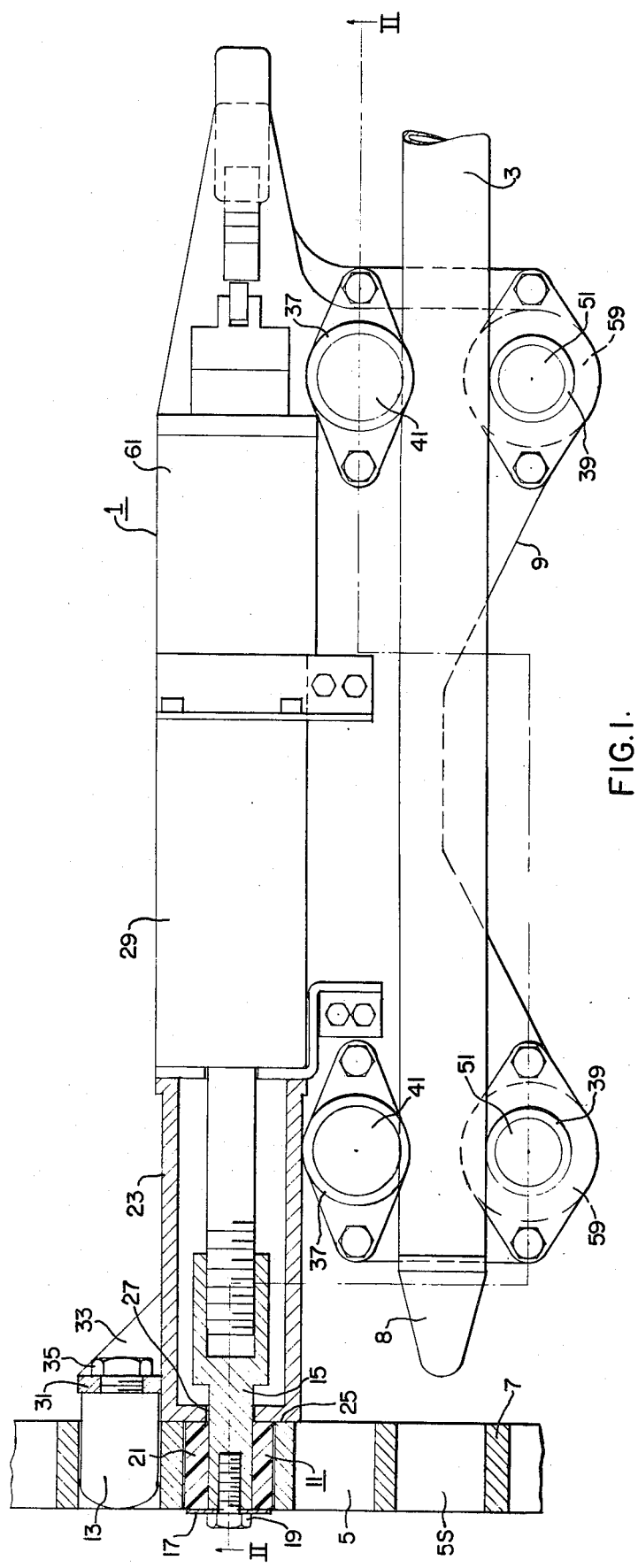
FIG. 1 is a plan view of a tube pushing apparatus made in accordance with this invention.
Figure 2:
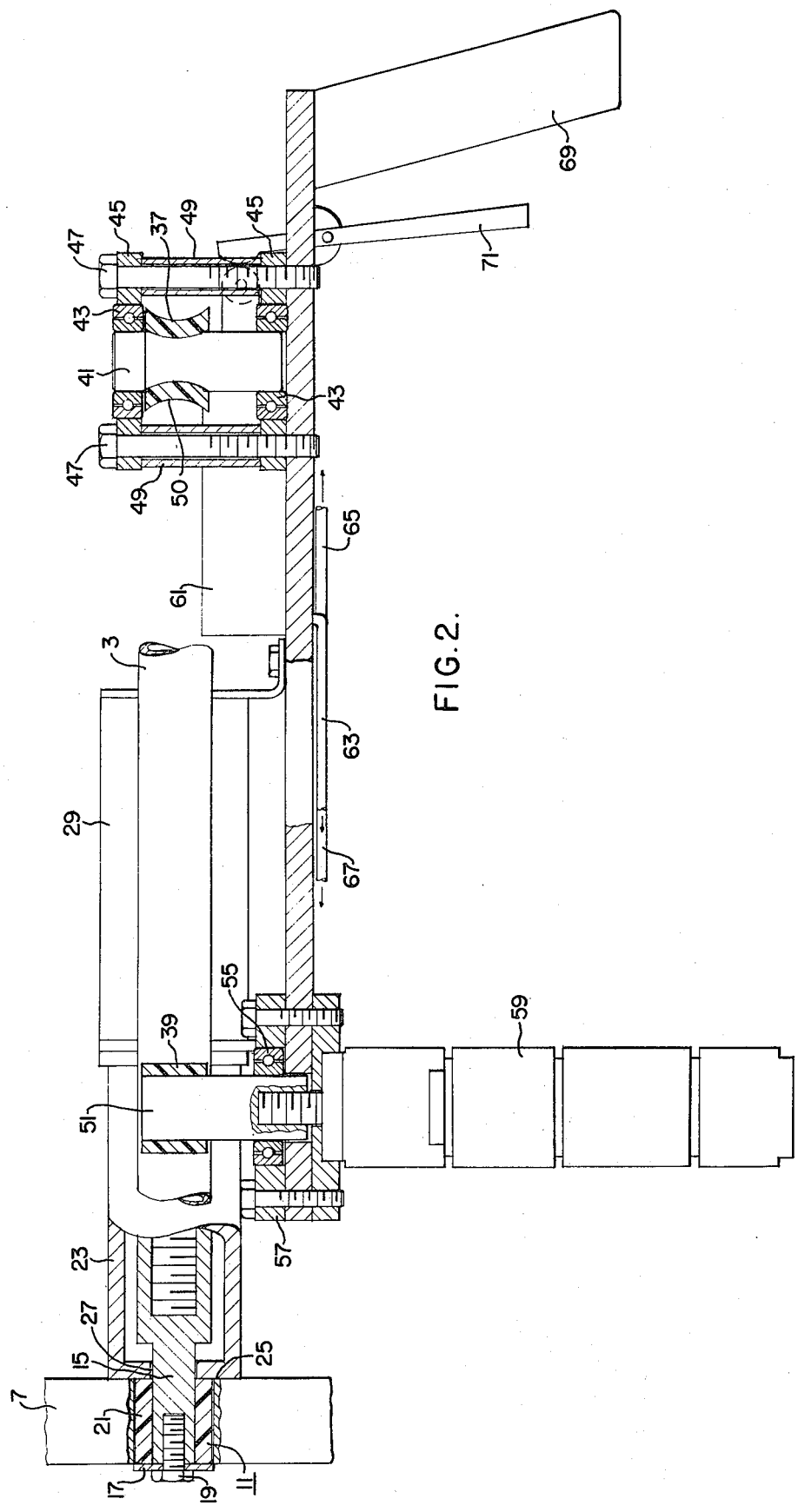
FIG. 2 is a sectional view taken on line II—II of FIG. 1.

Referring now to the drawings in detail, FIGS. 1 and 2 show apparatus 1 for pushing a tube 3 through a hole 5 in a tube sheet 7 of a heat exchanger. The tube 3 is fitted with a bullet-shaped insert 8 which guides the leading end of the tube 3 into the hole 5 in the tube sheet 7 and support plates (not shown).

The pushing apparatus 1 comprises a base plate 9 made of aluminum or other suitable material. A plurality, or as shown in this embodiment, two guide pins 11 and 13 are attached to the base plate 9 and are disposed to register with holes 5 in the tube sheet 7 to position the base plate 9 relative to a specific hole 5S through which the tube 3 is to be pushed.

The guide pin 11 is provided with means for expanding the pin 11 into engagement with the hole 5 in the tube sheet 7. The pin 11 comprises a shaft 15 and a flange 17 which extends radially outwardly from the end of the shaft 15. The flange 17 may be made integral with the shaft 15 or as shown in FIG. 1 it may comprise a washer fastened to the shaft by a cap screw 19 or other means.

A neoprene or elastomer sleeve 21 fits over the shaft 15 and butts against the flange 17. A tubular or other shaped bucking member 23 has a surface 25 which bucks up against the tube sheet 7 and a hole 27 through which the shaft 15 passes. A pneumatic or air cylinder or other force applying mechanism 29 is connected to the shaft 15 so as to pull the flange 17 toward the bucking surface 25 when the pneumatic cylinder 29 is activated, compressing the elastomer sleeve 21 axially and causing it to expand radially into engagement with the hole 5. When not so compressed the sleeve 21 slides freely in and out of the hole 5.

An ear 31 and gusset 33 are fastened to the tubular bucking member 23. The pin 13, which is generally bullet shaped, is fastened to the ear 31 by a cap screw 35 or other means. The pin 13 is slightly smaller in diameter than the hole 5 to provide a sliding engagement therewith.

At least one, but in the embodiment shown in the drawings, two idler rollers 37 are cooperatively associated with the base plate 9 and at least one, but in the embodiment shown in the drawings, two drive rollers 39 align the tube 3 with the hole 5S.

As shown best in FIG. 2, the idler rollers 37 have a shaft 41 which is rotatably mounted at each end in a bearing 43. The bearings 43 are disposed in a housing 45, which is fastened to the base plate 9 by cap screws 47 and sleeves 49 or other means.

The idler rollers 37 have a concave surface or an hour glass shape portion 50, which generally conforms to the outside surface of the tube 3, to assist in aligning the tube with the hole 5S in the tube sheet 7.

The drive roller 39 comprises a shaft 51 and an elastomer sleeve 53 disposed over one end thereof. The shaft 51 is supported by a bearing 55, which is mounted in a bearing housing 57 connected to the base plate 9. A pneumatic or air motor 59 or other driving means is connected to the shaft 51 providing means to drive the drive roller 39 in order to push the tube 3 into the hole 5S in the tube sheet 7. The pneumatic motor 57 is preferably sized so that the output torque is limited so the motor stalls, if the tube becomes jammed. Alternately, the elastomer sleeve 53 may be made so as to slip without damaging the tube 3 should the tube 3 become jammed.

In the embodiment shown in FIG. 1, two air motors 59 and two drive rollers 39 are disposed adjacent two idler rollers 37 and while this arrangement is preferred, the apparatus would be operable with a single drive or idler roller respectively disposed intermediate two idler or two drive rollers.

A pneumatic or air valve means 61 is mounted on the base plate 9. The valve 61 is fluidly connected to a supply of pressurized fluid or air and also fluidly connected to the pneumatic motor 59 via conduits 63 and 65 and to the pneumatic cylinder 29 via the conduit 67.

A handle 69 is fastened to the base plate 9 on the end opposite the guide pins 11 and 13.

Adjacent the handle is a lever 71 which is cooperatively associated with the valve 61 to operate the valve 61, which in turn actuates the air cylinder 29 to expand the elastomer sleeve 21 on the guide pin 13 into engagement with the hole 5 and simultaneously actuates the pneumatic motors 59 to push a tube 3 through the hole 5S.

The tube pushing apparatus hereinbefore described provides a simple machine, which anchors itself to the tube sheet 7 and pushes the tube 3 into a hole 5S therein, thereby eliminating the walking associated with manually inserting tubes in large heat exchangers such as condensers.

What we claim is:

1. An apparatus for pushing tubes through holes in a tube sheet of a heat exchanger, said apparatus comprising a base portion,
a plurality of guide pins which register with holes in the tube sheet to position the base plate relative to a specific hole through which a tube is to be pushed,
at least one idler roller disposed on said base portion,
at least one drive roller disposed on said base portion, said rollers being cooperatively associated to align said tube with said specific hole,
means for driving said drive rollers to push said tube through said specific hole and into said heat exchanger.

2. Apparatus as set forth in claim 1 wherein at least one of said rollers has a concave surface which generally conforms to the outside surface of said tube.

3. Apparatus as set forth in claim 1 wherein there are two idler rollers.

4. Apparatus as set forth in claim 1 wherein there are two drive rollers.

5. Apparatus as set forth in claim 1, wherein at least one of said guide pins has cooperatively associated therewith means for expanding said pin into engagement with said hole with which it registers.

6. Apparatus as set forth in claim 5 wherein the last-mentioned guide pin is partially formed of an elastomer sleeve and the means for expanding the pin into engagement with the hole comprises means for compressing said elastomer member axially, whereby it expands into radial engagement with said hole.

7. Apparatus as set forth in claim 1, wherein the means for driving said drive roller is an air motor which has a limited torque output so as to stall, if said tube jams as it is being pushed into said heat exchanger.

8. Apparatus as set forth in claim 4, wherein the means for driving said drive roller is an air motor which has a limited torque output so as to stall, if said tube jams as it is being pushed into said heat exchanger.

9. Apparatus as set forth in claim 8 wherein the drive rollers are covered with an elastomer sleeve.

10. Apparatus as set forth in claim 1, wherein the drive roller is covered with an elastomer sleeve.

11. Apparatus as set forth in claim 5, wherein the means for expanding said pin and the means for driving said drive rollers are actuated by a common valve means so as to respond simultaneously.

\* \* \* \* \*